United States Patent [19]
Moulavi

[11] Patent Number: 5,876,535
[45] Date of Patent: Mar. 2, 1999

[54] METHOD FOR ALIGNING RUG FRINGE AND RUG OBTAINED THEREBY

[76] Inventor: Ouri Moulavi, 90 Vinet Apt. 308, Montréal, P.Q., Canada, H3J 2C9

[21] Appl. No.: 468,614

[22] Filed: Jun. 6, 1995

[51] Int. Cl.[6] .............................. B32B 31/12; B32B 31/00
[52] U.S. Cl. ........................ 156/88; 156/296; 156/297; 156/324.4; 428/115
[58] Field of Search .................................... 428/115, 192, 428/194; 156/60, 88, 166, 296, 297, 302, 324.4; 139/385; 112/409

[56] References Cited

U.S. PATENT DOCUMENTS

| | | | |
|---|---|---|---|
| 445,228 | 1/1891 | Middleton et al. | 428/194 |
| 463,651 | 11/1891 | Taylor | 428/115 |
| 1,470,097 | 10/1923 | Neff | 139/385 |
| 1,773,321 | 8/1930 | Schaffner | 428/115 |
| 1,784,657 | 12/1930 | De Benedictis | 428/115 |
| 2,119,081 | 5/1938 | Knowland | 156/88 |
| 2,294,480 | 9/1942 | Rohweder et al. | 428/115 |
| 5,010,723 | 4/1991 | Wilen | 57/210 |

*Primary Examiner*—Alexander Thomas

[57] ABSTRACT

The method comprises straightening the threads of the fringe of a rug, carpet or the like, and applying a product on the fringe without displacing the straightened threads and causing the product to be engaged with the threads of the fringe, so that the threads stay evenly aligned.

9 Claims, 3 Drawing Sheets

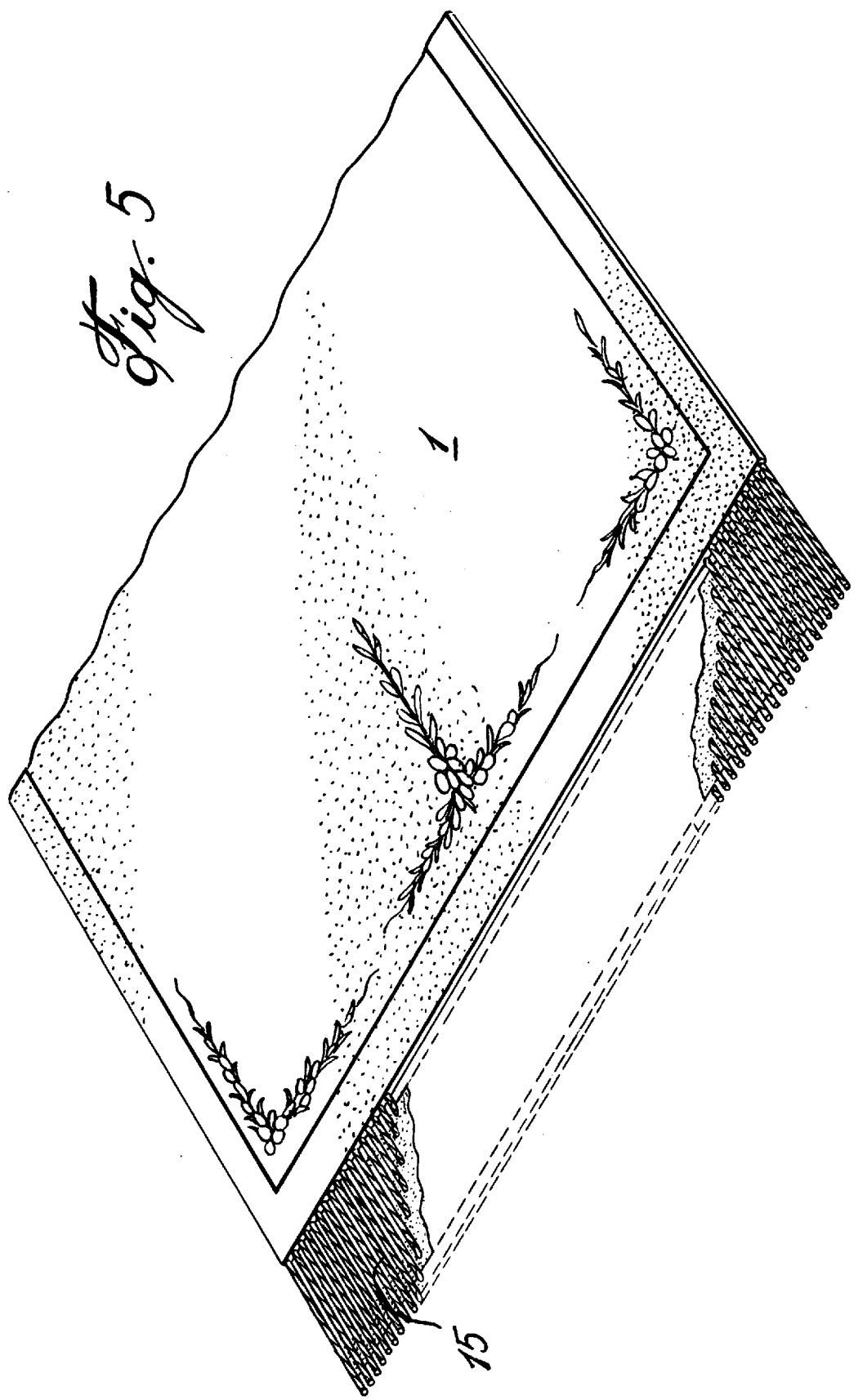

METHOD FOR ALIGNING RUG FRINGE AND RUG OBTAINED THEREBY

BACKGROUND OF INVENTION (a) Field of the Invention

The present invention relates to a method for evenly aligning the fringes or tassels or the like of a rug or the like, and is also concerned with a rug provided with such fringes or tassels. Any time the word "fringe" is used in this specification it is intended to include fringes, tassels or the like. Similarly as used herein the term "rug" includes rugs, carpets, tapestries or the like. More particularly, the present invention is directed to the production of a rug wherein the threads constituting its fringes are set in evenly aligned fashion to stay neat and straight. The result is a rug wherein the fringe or tassel remains evenly aligned with the threads being generally parallel to one another.

(b) Description of Prior Art

It is well known that fringes or tassels that are seen on most area rugs and carpets as well as on tapestries and similar products create a problem which has been the subject of complaints by many people, because these fringes or tassels never stay neat and straight. The fringes look messy, tangled and out of place and must constantly be brushed and straightened only to become messy and tangled all over the again. Messy fringes create an unpopular task that many homeowners as well as commercial establishments, such as hotels, offices, stores, and the like, where carpets or rugs are present, must constantly perform and repeat. The task involves a never ending brushing and straightening of the fringes on rugs and carpets in order to keep them looking neat and presentable.

As far as Applicant is concerned, the prior art has failed to address the above problem.

U.S. Pat. No. 445,228 describes a strip applied by means of adhesive material on the border of an uncut material.

U.S. Pat. No. 463,651 describes a fabric which is stitched on loops to provide a beaded ruching.

U.S. Pat. No. 1,773,321 describes strips secured on the body of a belt wherein the strips have free edges in the form of threads.

U.S. Pat. No. 1,784,657 discloses a tape which is sewn together with the fringe and border of a rug to provide stiffer edges. The tape itself has no effect whatsoever on the fringe.

U.S. Pat. No. 2,294,480 describes a strip which is used to hold the bristles of a paint brush.

It will therefore be seen that the prior art has not disclosed how to solve the problem of messy fringes of rugs or the like.

SUMMARY OF INVENTION

It is an object of the present invention to provide a method for solving the problem caused by messy fringes.

It is another object of the present invention to provide a rug or the like having a neat and orderly arranged fringe.

More specifically, the present invention relates to a method for forming a rug with at least one fringe wherein the threads stay evenly aligned. The method comprises straightening the threads of the fringe, and treating the threads to hold them evenly aligned and parallel to one another, for example by means of a tape, a spray or the like.

Preferably, this is accomplished by applying a tape on the reverse side or on the top side of the fringe without displacing the straightened threads. This is followed by causing the tape to adhesively engage with the threads of the fringe.

For example, the method may comprise folding one end of the rug having a fringe so that the reverse side of the fringe faces upwardly before the threads are straightened. Straightening the fringe may be carried out by longitudinally brushing the fringe in the direction of the threads away from the rug so as to straighten the threads to be substantially parallel to one another.

The tape is preferably made of a heat activatable material and may be adhesively engaged with the threads by heating it while it is in contact with the threads. Heating may be carried out by any means known to those skilled in the art, for example, by passing a heating device or the like such as an iron over the tape.

The tape may be transparent so that it will literally disappear behind the fringe or it may be colored, such as possessing the same color as the fringe itself, or opaque.

The invention also relates to a rug having at least one fringe wherein the threads are evenly aligned and substantially parallel to one another, and means for holding the threads permanently and evenly aligned and parallel to one another, such as a tape which is adhesively engaged with the threads on the reverse side thereof or any other means.

BRIEF DESCRIPTION OF THE DRAWINGS

The invention will now be illustrated by means of the annexed drawings, which are given merely for the purpose of illustration but without limitation.

IN THE DRAWINGS

Figure 1:
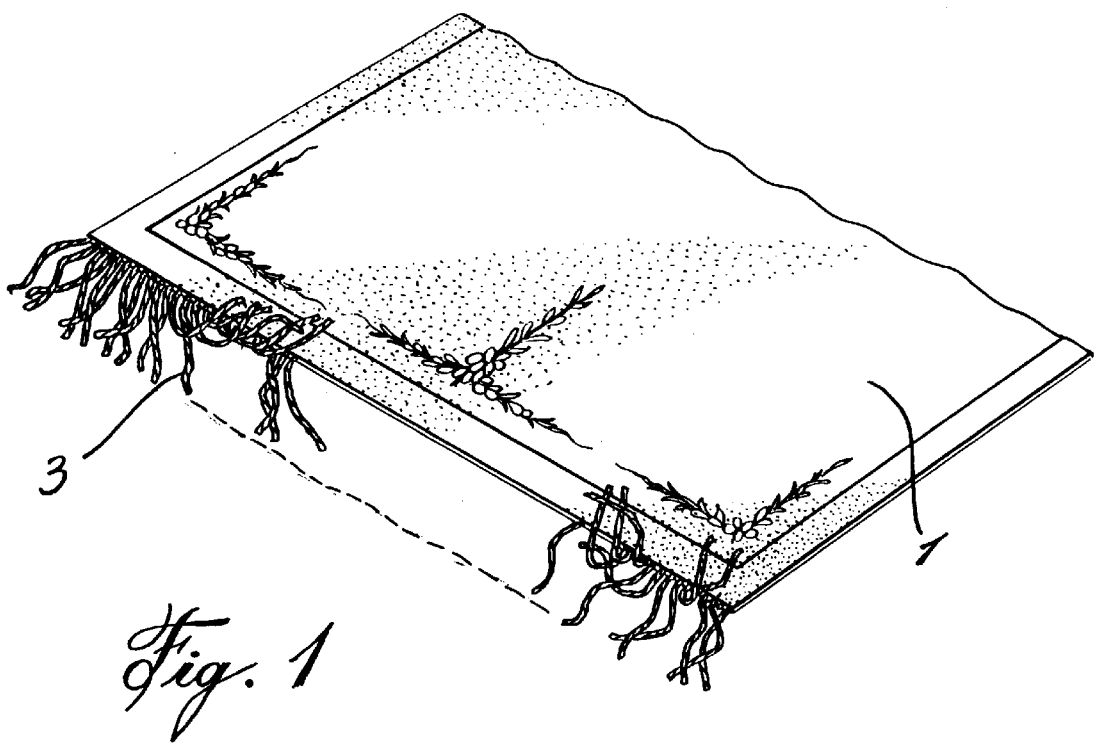
Figure 3:
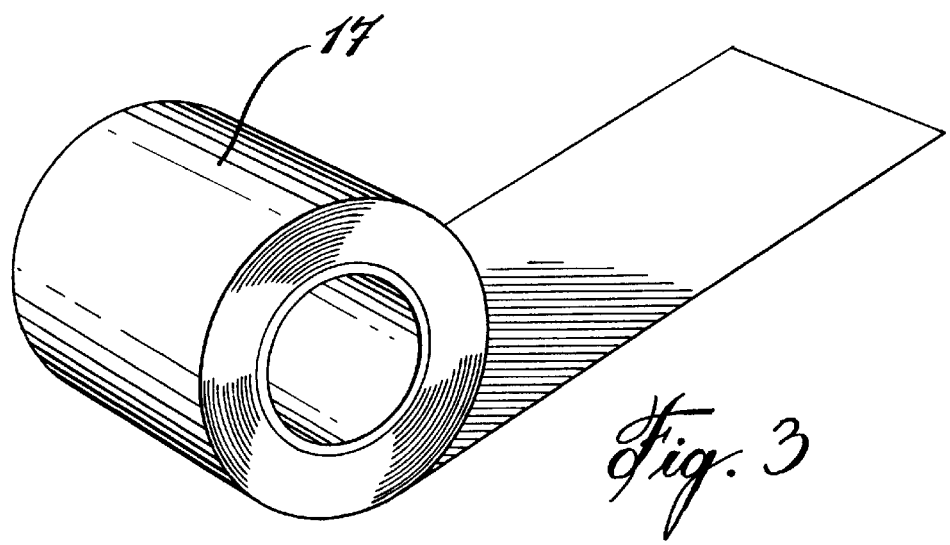
Figure 2:
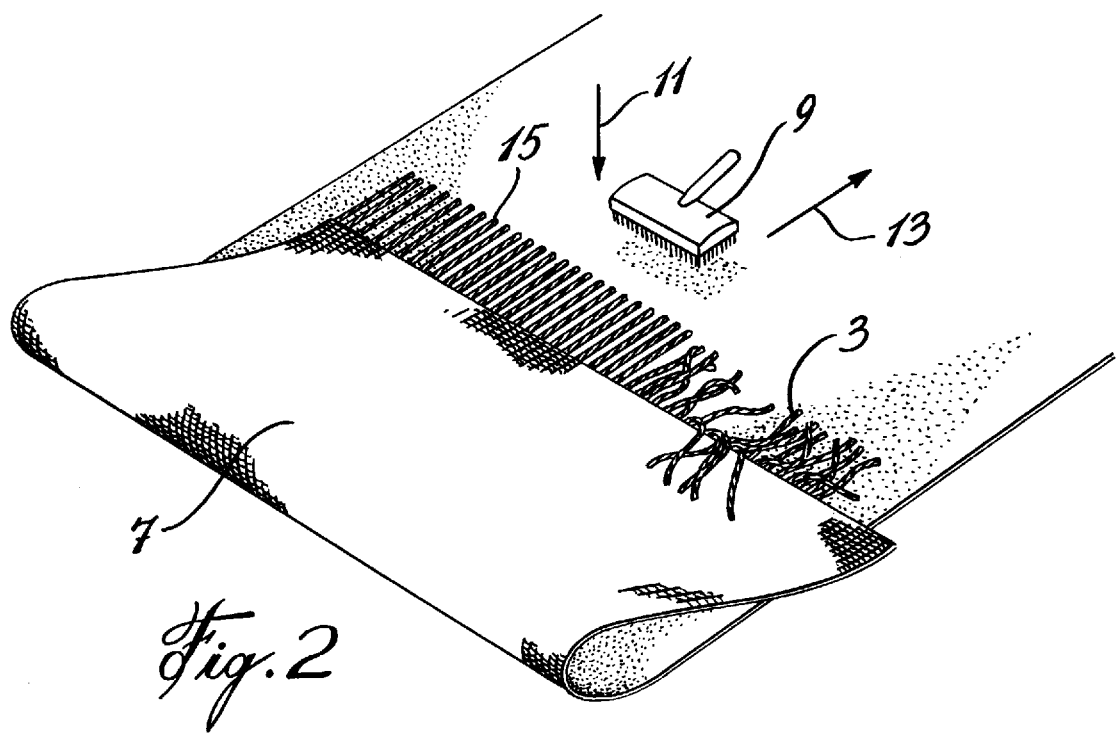
Figure 4:
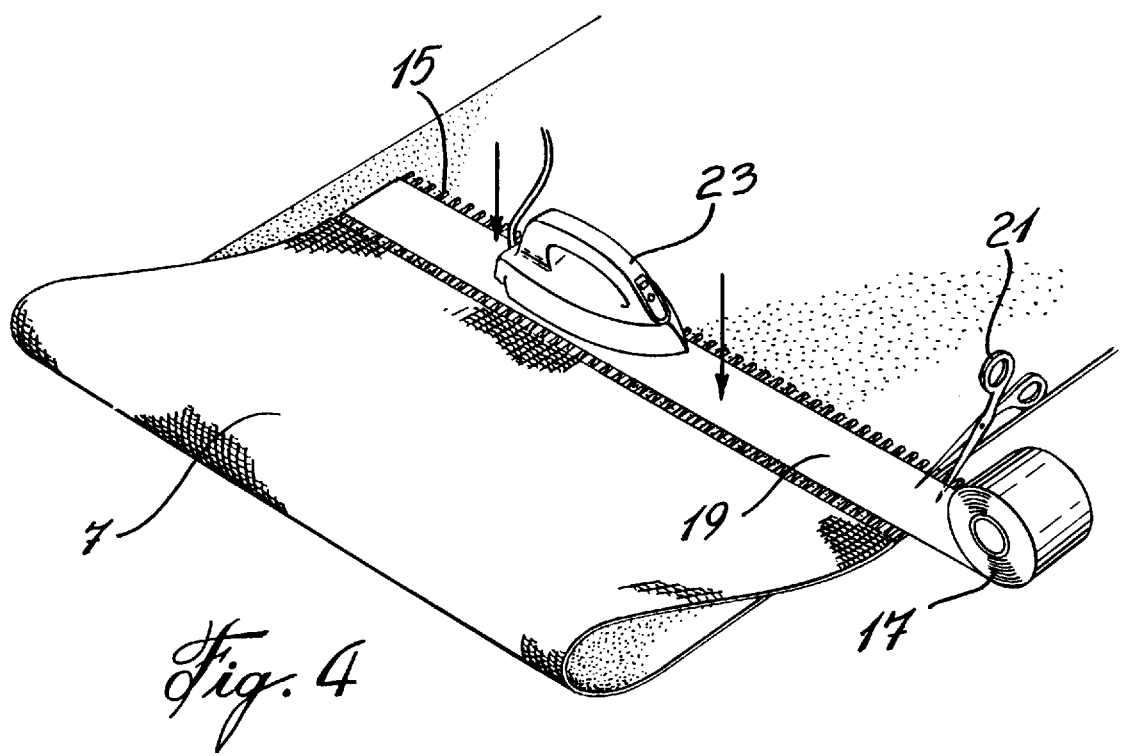

FIG. 1 is a view of a rug showing one end fringe as they normally appear when the rug is in use;

FIG. 2 is an illustration of the first step of the method according to the invention;

FIG. 3 is a perspective view of a tape that can be use in the method according to the invention;

FIG. 4 is a perspective view showing the step of applying the tape and engaging it with the fringe.

FIG. 5 is a view of one end of a rug having a fringe treated by the method according to the invention, with the tape below the fringe.

DESCRIPTION OF PREFERRED EMBODIMENTS

With reference to the drawings, the idea is to treat a rug 1 having fringe 3 at one end thereof. That fringe is one which normally appears on a standard rug, i.e., it looks somewhat messy, tangled and out of place.

To provide rug 1 with a neat and straight fringe as shown in FIG. 5, the end of rug 1, in the present case, the end having fringe 3 is flipped to its backside as shown in FIG. 2, exposing the rear 7 of the rug and the backside of fringe 3. By means of a brush 9 of a design known to those skilled in the art, fringe 3 is brushed and straightened in the direction of arrows 11 and 13 away from the end of rug 1, until the fringe has the desired neat look as illustrated in fringe portion 15.

Once the fringe has been completely brushed and straightened as shown in FIG. 4, a portion of tape 17 is unrolled and placed directly on the backside of the fringe with the adhesive side 19 facing fringe 15. The tape can have its own adhesive to be instantaneously adhered to the fringe upon contact. However, this is not so practical, and according to a preferred embodiment of the invention, the tape is made of a heat activatable material on face 19 which can be engaged with the fringe upon heating. A preferred tape is for example one sold by TAILORFORM under the trade designation FUSIBLE WAISTBAND. For this purpose, after having applied the tape portion on straightened fringe 15, as shown the tape is cut to proper length, such as by means of a scissor 21, to the exact length of the span of the fringe. Then, an iron 23 is slowly and firmly passed over tape 17 and fringe portion 15 while pressing the iron 23 down on the tape and fringe, by gradually moving it from one end of the tape to the other end. This will cause the fringe to be stuck to the tape which will remain firmly engaged with the fringe. The end of the rug is then flipped back to its top side, and the fringe then stays straight and neat, does not move or become messy or tangled, unless the tape is removed from the underside of the fringe.

Of course, any other means known to those skilled in the art could be used instead of a tape such as by applying a composition or the like on the fringe or sewing the threads together which will enable it to remain straight and even.

A rug which has been treated by the method according to the invention will have a fringe which has the appearance as shown in FIG. 5 of the drawings. The threads constituting the fringe will appear straightened and substantially parallel to one another and if the tape is transparent, it will practically become invisible.

Although the invention has been described with respect to a preferred embodiment, it is understood that modifications are possible without departing from the scope and spirit of the present invention as long as they are within the ambit of the annexed claims.

I claim:

1. Method for forming a rug with at least one fringe wherein threads thereof stay evenly aligned, which comprises:

straightening, if necessary, the threads of said at least one fringe;

applying a tape on said fringe without displacing the straightened threads; and causing said tape to adhesively engage with said threads of said fringe.

2. Method according to claim 1, wherein said tape is applied on the reverse side of said fringe.

3. Method according to claim 1 which comprises also applying to said threads a composition enabling said threads to remain straight and even.

4. Method according to claim 1, which comprises folding one end of said rug having said fringe so that the reverse side of said fringe faces upwardly before straightening said threads.

5. Method according to claim 4, which comprises longitudinally brushing said fringe in direction of said threads so as to evenly straighten same to be substantially parallel to one another.

6. Method according to claim 5, wherein said tape is heat activatable, and said tape is adhesively engaged with said threads by heating said tape while it is in contact with said threads.

7. Method according to claim 6, wherein said heating is carried out by passing a heating element over said tape.

8. Method according to claim 7, wherein said tape is transparent.

9. Method according to claim 7, wherein said tape is colored or opaque.

* * * * *